(12) United States Patent
Yemini

(10) Patent No.: US 6,213,482 B1
(45) Date of Patent: Apr. 10, 2001

(54) BARRIER FOR EXPANDING CAPACITY OF A WHEELBARROW

(75) Inventor: Zvi Yemini, Tel Aviv (IL)

(73) Assignee: ZAG Industries Ltd., Rosh Haayin (IL)

( * ) Notice: Subject to any disclaimer, the term of this patent is extended or adjusted under 35 U.S.C. 154(b) by 0 days.

(21) Appl. No.: 08/908,435

(22) Filed: Aug. 7, 1997

(51) Int. Cl.[7] .................................................. B62B 1/02
(52) U.S. Cl. ............................ 280/47.26; 280/47.31; 298/2; 298/3
(58) Field of Search .................. 280/47.3, 47.31, 280/47.26, 47.32, 47.33, 769; 298/2, 3; 248/98, 97, 99

(56) References Cited

U.S. PATENT DOCUMENTS

| 3,161,434 | * | 12/1964 | Jerpbak | 280/47.31 |
| 3,168,271 | * | 2/1965 | Deschenes | 248/98 |
| 3,870,367 | * | 3/1975 | O'Brien | 298/3 |
| 3,888,442 | * | 6/1975 | Comeaux | 248/98 |
| 3,893,699 | * | 7/1975 | Morris | 248/98 |
| 5,209,517 | * | 5/1993 | Shagoury | 248/98 |
| 5,374,095 | * | 12/1994 | Ramseth | 280/47.31 |
| 5,678,842 | * | 10/1997 | Hook et al. | 248/98 |

OTHER PUBLICATIONS

Advertisement from HET FORT BV, Simon Stevinstraat 6, 4004 JV Tiel, Germany, Fort Accessories: Grasshopper, prior to Aug. 1997, one page.

Advertisement from GrosFillex S.A.R.L., 01107 Oyonax, France, Garden Cart, prior to Aug. 1997, one page.

Advertisement from Trailer Barrow, prior to Aug. 1997, one page.

* cited by examiner

Primary Examiner—Richard M. Camby
(74) Attorney, Agent, or Firm—Pillsbury Madison & Sutro LLP

(57) ABSTRACT

An add-on barrier for a wheelbarrow for expanding the volume capacity of the wheelbarrow, the barrier comprising a substantially rectangular baseless frame having substantially vertically disposed walls, the frame including a plurality of legs for mounting the frame over the wheelbarrow, the frame further including a plurality of integral hinged bag retainers for retaining a bag in an expanded volume formed by volume contributions of the wheelbarrow and the frame.

17 Claims, 7 Drawing Sheets

BARRIER FOR EXPANDING CAPACITY OF A WHEELBARROW

FIELD AND BACKGROUND OF THE INVENTION

The present invention relates to a barrier for expanding the volume capacity of a wheelbarrow and, more particularly, to a collapsible barrier which includes integral hinged snap-on bag retainers.

A wheelbarrow is a box for conveying a load, supported at one end by a wheel or wheels, and lifted and pushed or pulled at the other by handles. When employed for gardening, wheelbarrows are also known as lawn carts. In some cases a conventional wheelbarrow is equipped with a tow hook, such that it can be locomoted via a vehicle such as a small tractor. All of these and other configurations are referred herein as a wheelbarrow.

The volume of load which may be contained in a wheelbarrow is limited by its internal volume. Since in many cases, such as when the load is gardening debris, the specific weight of the load is relatively low and more of it could have been loaded into a lawn cart provided it was equipped with a suitable barrier to expand its volume capacity.

To this end dedicated add-on barriers were developed. Such prior art add-on barriers are basically baseless frames designed capable of being secured on top of an existing wheelbarrow, such that the combined volume of the wheelbarrow and on barrier capacity is increased, thereby increasing the total load capacity.

One prior art add-on barrier is distributed by HET FORT BV, metaalwarenfabriek, Simon Stevinstraat 6, 400 JV Tiel, Germany. This barrier includes a baseless plastic frame of a net structure equipped with dedicated hooks, legs or clips which are used to secure the frame on top of a wheelbarrow container featuring a rounded edge.

Another prior art add-on barrier is distributed by trailer BARROW. This barrier includes a baseless metal frame of a net structure equipped with dedicated metal hooks, legs or clips which are used to secure the frame on top of a wheelbarrow container.

Yet another prior art barrier, which can be added only to a matching wheelbarrow is distributed by GrosFillex S.A.R.L. 01107 Oyonax France. This barrier includes a loose construction, formed as a pair of elevated rails disposed along the sides of the wheelbarrow. The rails, which are supported by dedicated acceptors formed in the wheelbarrow (which is therefore matching), serve for mounting a nylon bag, which forms the enlarged volume capacity. The bag is engaged to the rails by snap-on clips (bag retainers). The use of a bag is advantageous since it enables a user to easily dispose the load into a garbage can, an otherwise messy task.

However this construction has disadvantages since (i) it requires modifications in the wheelbarrow itself and therefore cannot be employed with existing wheelbarrows; and (ii) the bag is hanged from the rails, yet in its upper parts it is not supported by a solid support and may therefore break. Another disadvantage is that the clips do not form an integral part of the barrier and may therefore be lost.

The more solid barrier configurations described above are not provided with clips altogether and therefore are limited with respect to the use of a bag.

There is thus a widely recognized need for, and it would be highly advantageous to have, an add-on barrier for a wheelbarrow which includes integral hinged snap-on bag retainers (i) for expanding the capacity of the wheelbarrow and, at the same time, (ii) for providing integral retainers for holding a bag therein.

SUMMARY OF THE INVENTION

According to the present invention there is provided an add-on barrier for a wheelbarrow for expanding the volume capacity of the wheelbarrow.

According to further features in preferred embodiments of the invention described below, the barrier comprising a substantially rectangular baseless frame having substantially vertically disposed walls, the frame including a plurality of legs for mounting the frame over the wheelbarrow, the frame further including a plurality of integral hinged bag retainers for retaining a bag in an expanded volume formed by volume contributions of the wheelbarrow and the frame.

According to further features in preferred embodiments of the invention described below, provided is a combination comprising (a) a wheel barrow; and (b) an add-on barrier for expanding the volume capacity of the wheelbarrow, the barrier including a substantially rectangular baseless frame having substantially vertically disposed walls, the frame including a plurality of legs for mounting the frame over the wheelbarrow, the frame further including a plurality of integral hinged bag retainers for retaining a bag in an expanded volume formed by volume contributions of the wheelbarrow and the frame.

According to still further features in the described preferred embodiments the combination further comprising a bag retained by the plurality of integral hinged bag retainers, the bag encompasses the expanded volume formed by the volume contributions of the wheelbarrow and the frame According to still further features in the described preferred embodiments the baseless frame has a net structure.

According to still further features in the described preferred embodiments the baseless frame is made of a material selected from the group of metal and plastic.

According to still further features in the described preferred embodiments each of the plurality of integral hinged bag retainers includes a flexible strap connected to or integrally formed with the frame at one end and a snap-on clip connected to the strap on its other end, the snap-on clip serving for fixating the bag to the walls of the frame, thereby retaining the bag in the expanded volume.

According to still further features in the described preferred embodiments the walls of the frame are formed with a plurality of openings which accommodate the plurality of integral hinged bag retainers when the retainers are not in use.

According to still further features in the described preferred embodiments the walls of the frame are formed with a plurality of openings which accommodate the plurality of integral hinged bag retainers when the retainers are not in use.

According to still further features in the described preferred embodiments the frame is collapsible.

The present invention successfully addresses the shortcomings of the presently known configurations by providing an add-on barrier for a wheelbarrow which includes integral hinged snap-on bag retainers (i) for expanding the capacity of a wheelbarrow and, at the same time, (ii) for providing integral retainers for holding a bag.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of an add-on barrier for a wheelbarrow which includes integral hinged snap-on bag retainers which can be used for expanding the volume capacity of a wheelbarrow. Specifically, the present invention can be used for retaining a bag, such as a plastic, paper or nylon bag, in the combined volume of the wheelbarrow and barrier.

The principles and operation of a barrier according to the present invention may be better understood with reference to the drawings and accompanying descriptions.

Figure 1A:
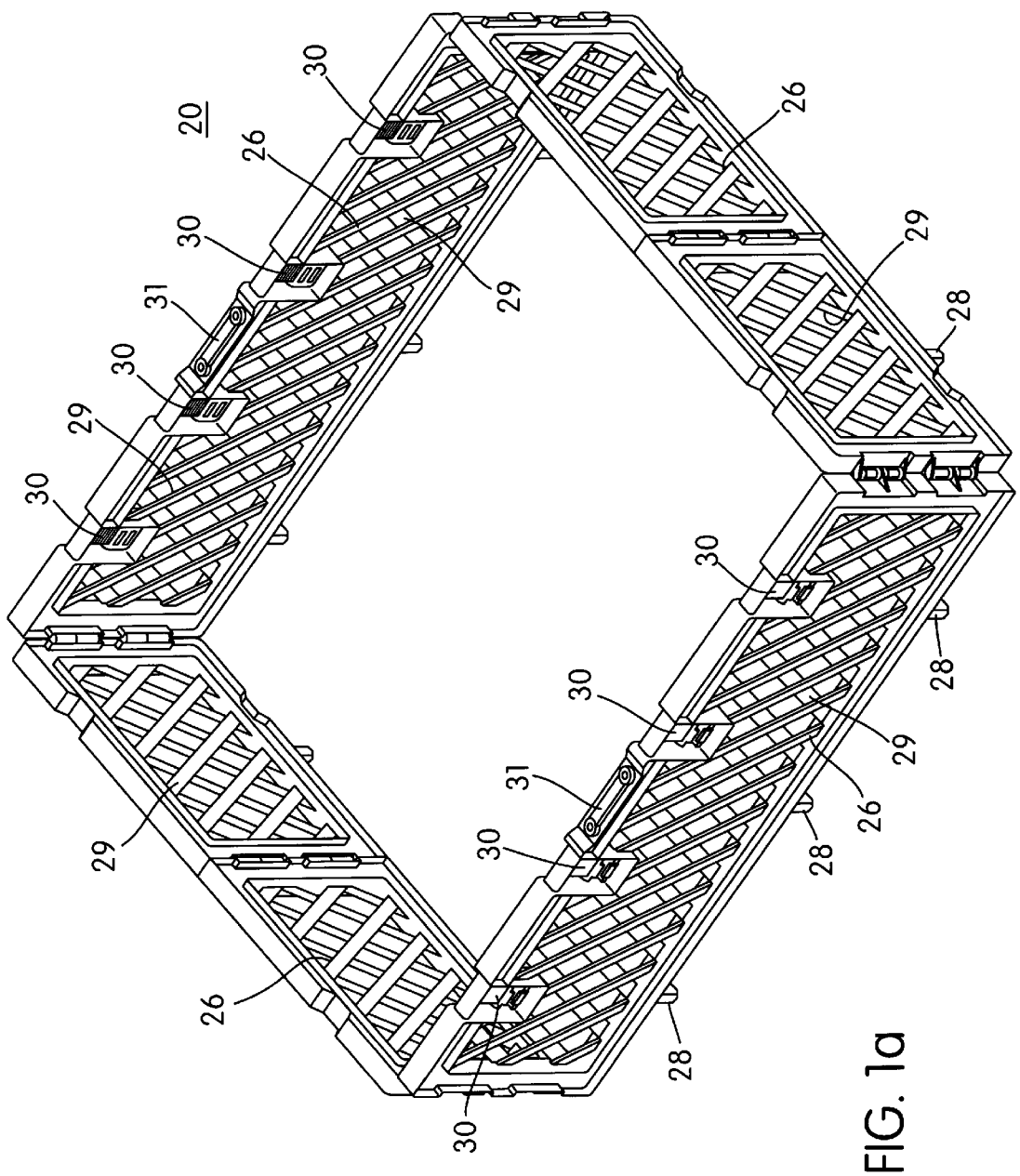
FIG. 1a is a perspective view of an add-on barrier according to the present invention, when erected.
Figure 1B:
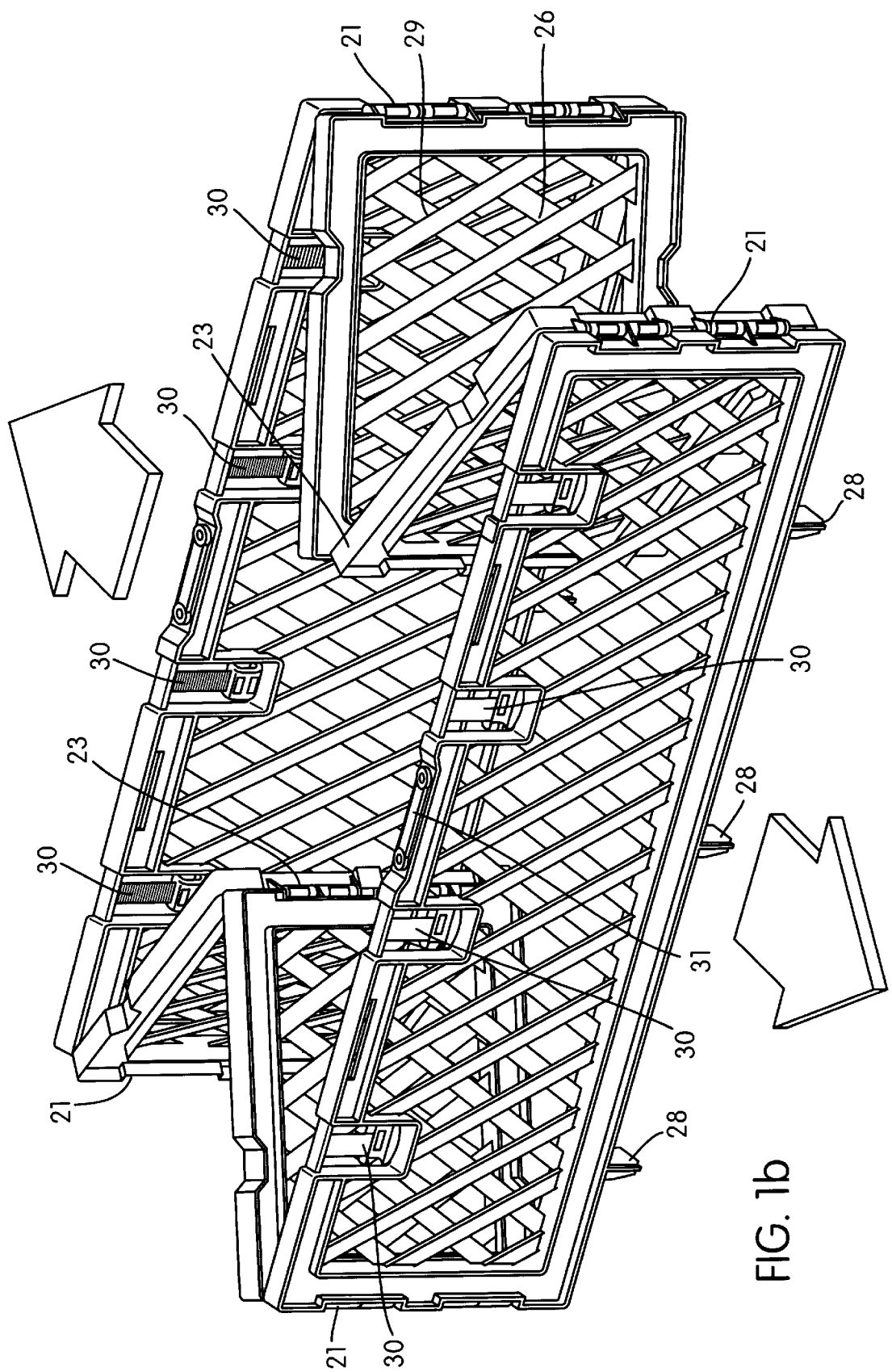
FIG. 1b is a perspective view of the add-on barrier shown in FIG. 1, when partially collapsed.
Figure 2:
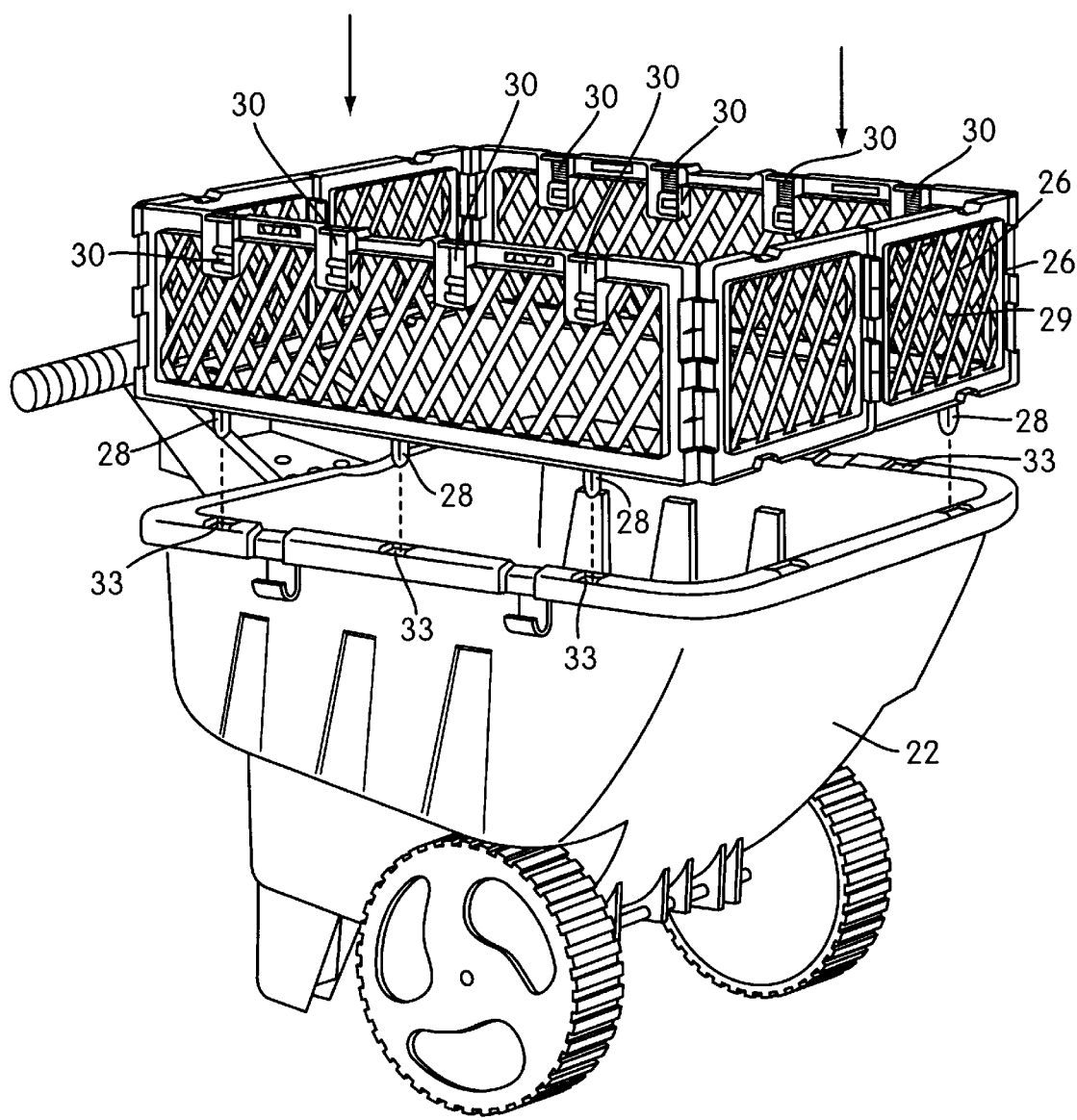
FIG. 2 is a perspective view of the barrier according to the present invention mounted over a wheelbarrow.

Referring now to the drawings, FIGS. 1a–b illustrate one example of an add-on barrier according to the present invention, referred to hereinbelow as barrier 20. FIG. 2 illustrates a wheelbarrow 22 over which barrier 20 is mounted.

Thus, barrier 20 serves for expanding the volume capacity of wheelbarrow 22. Barrier 20 includes a substantially rectangular baseless frame 24.

The term "substantially rectangular" as used in the specification and in the claims below refers to a variety of shapes that substantially match the opening of a wheelbarrow. Since the opening of a wheelbarrow is typically not a geometrical rectangle, e.g., in some cases it is rounded on the corners or featuring a wider at front, the term "substantially rectangular" refers also to shapes matching these options.

Frame 24 includes substantially vertically disposed walls 26. Frame 24 further includes a plurality of legs 28 (shaped as slightly inwardly angled legs, which serve as hooks) connected to or integrally formed with the bottom ends of walls 26. Legs 28 serve for mounting an securing frame 24 over wheelbarrow 22. The precise design of legs 28 depends on the construction of wheelbarrow 22. In a prefered embodiment, wheelbarrow 22 is formed with reciprocal acceptors 33 for receiving and accommodating legs 28.

Frame 24 further includes a plurality of integral hinged bag retainers 30. Retainers 30 serve for retaining a bag in the expanded volume 32 formed by volume contributions of both wheelbarrow 22 and frame 20.

Baseless frame 24 is preferably formed having a net structure 29. Net structure 29 is presently advantageous since it reduces the overall weight of barrier 20. Frame 24 may be made of any suitable material. Preferably Frame 24 is made of plastic or metal, most preferably frame 24 is made of plastic.

As best seen in FIG. 1b, Frame 24 is preferably collapsible. To this end, according to a prefered embodiment of the invention adjacent walls 26 of frame 24 are hingedly connected therebetween via hinges 21 and two opposite walls 26 are composed of two wall elements hingedly connected therebetween via hinges 23, such that the wall elements may collapse in between the other walls. Frame 24 is preferably equipped with lockers 31 to lock frame 24 in its collapsed configuration.

Figure 4:
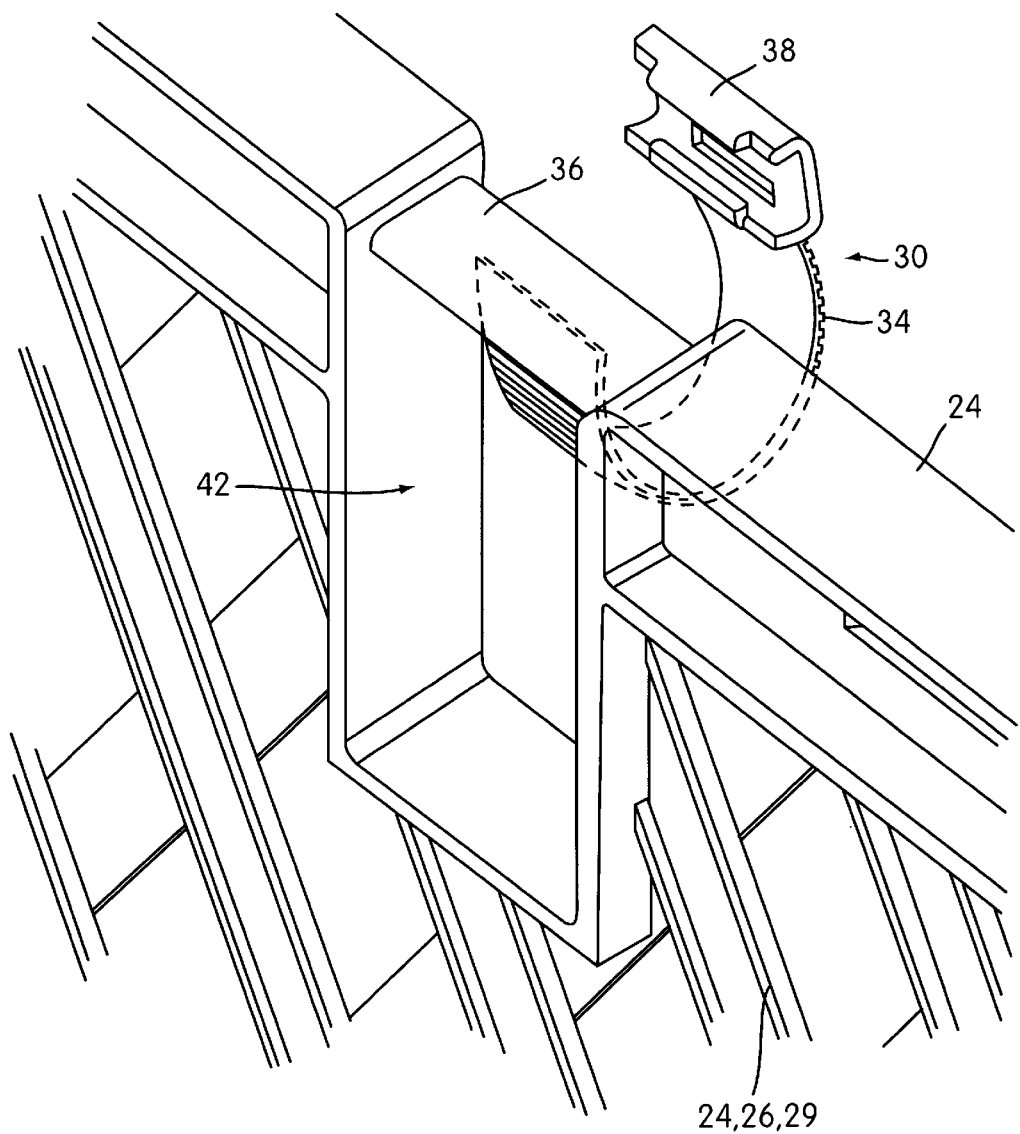
Figure 5:
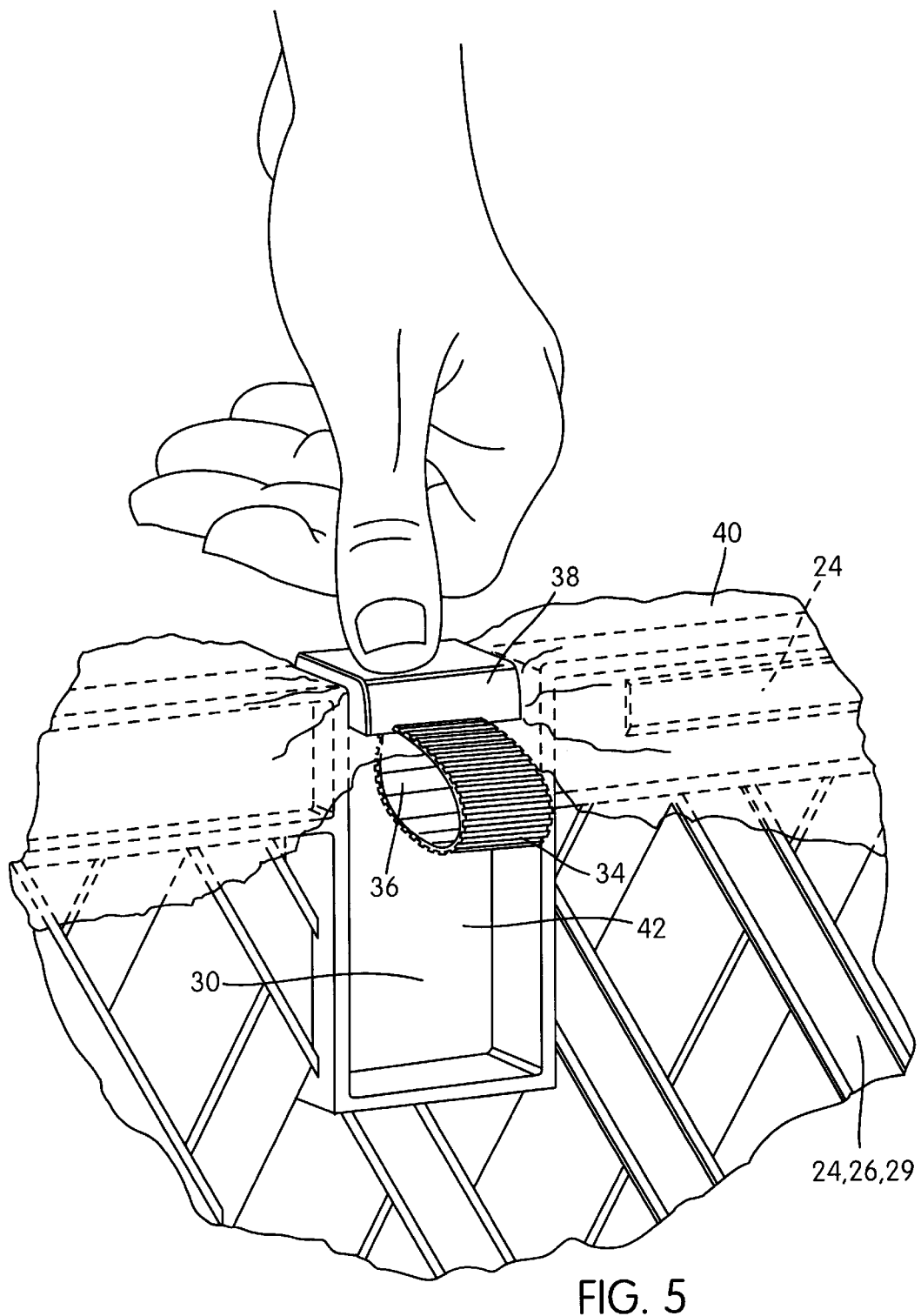
Figure 6:
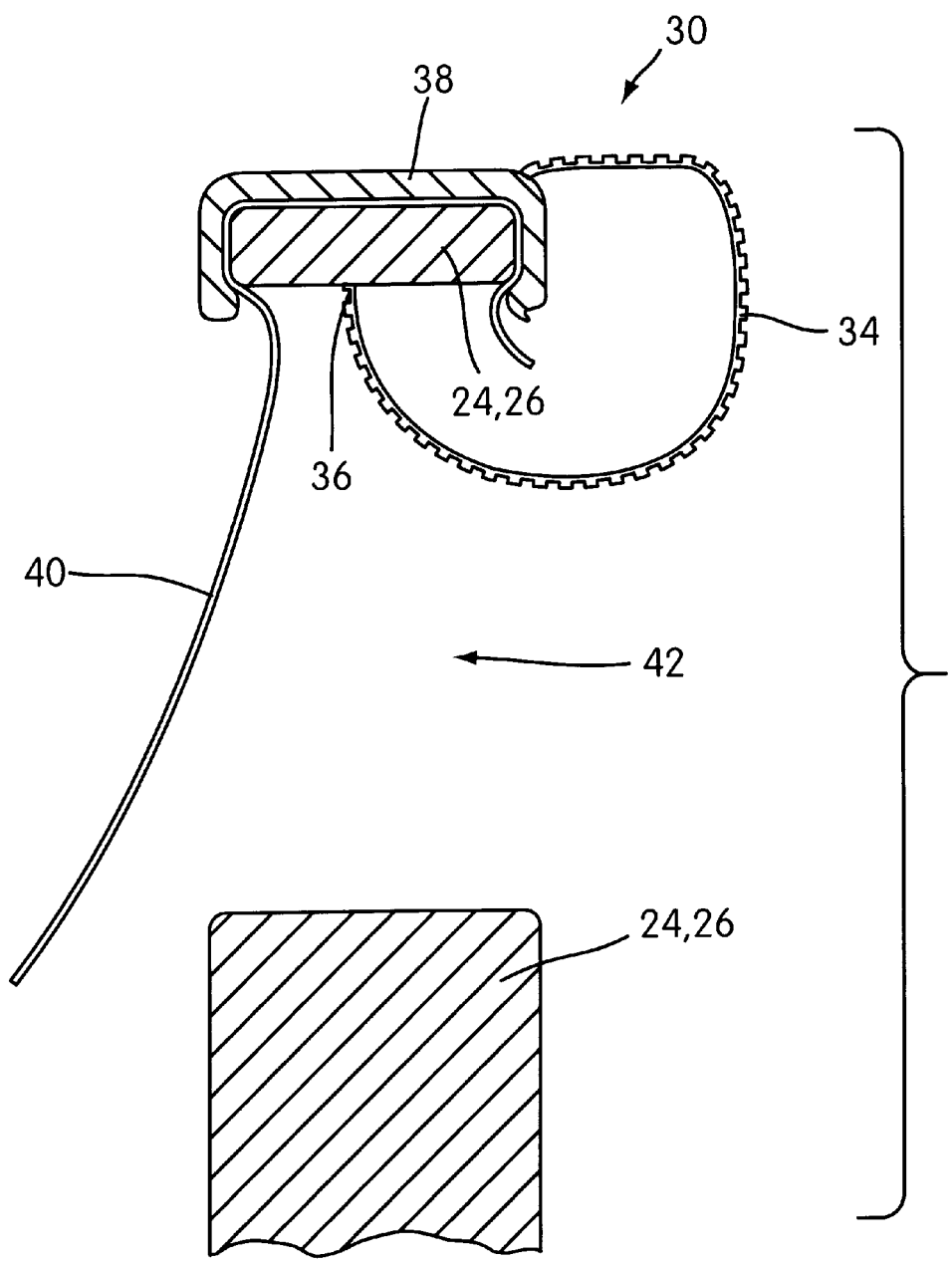
FIG. 6 is a cross section view of the retainer.

FIGS. 4–6 illustrate the construction and demonstrate the operation of a single integral hinged bag retainer 30.

Thus, retainer 30 includes a flexible strap 34. Strap 34 is connected to or integrally formed with frame 24 at one end 36 thereof. A snap-on clip 38 is connected to or integrally formed with the other end 40 of strap 34. Snap-on clip 38 serves for fixating a bag 40 to walls 26 of frame 24, thereby retaining bag 40 in expanded volume 32.

Figure 3:
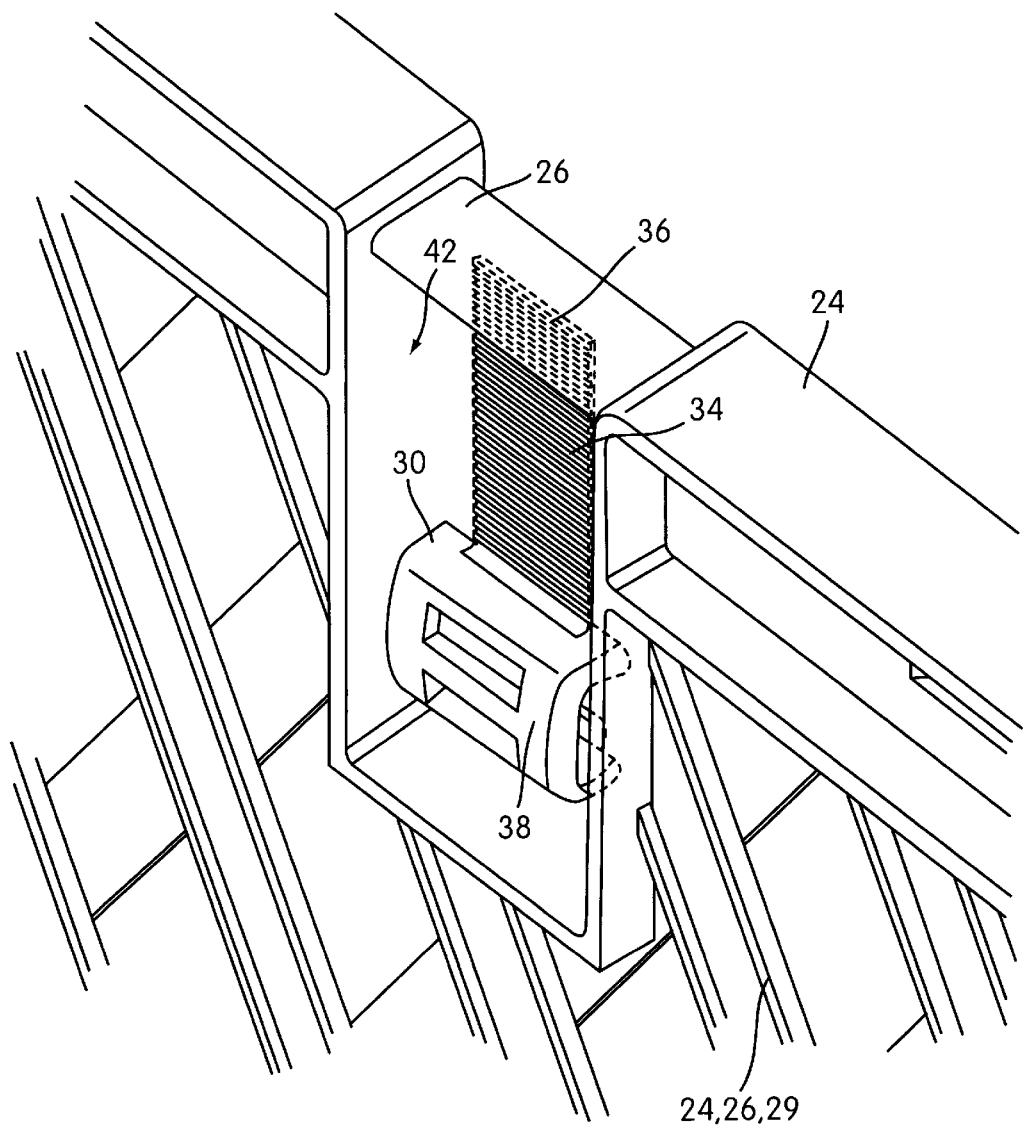
FIGS. 3–5 are perspective views of a single integral hinged snap-on bag retainer formed in the barrier according to the present invention.

In a prefered embodiment of the invention walls 26 of frame 24 are formed with a plurality of openings 42, each accommodates one of the plurality of integral hinged bag retainers 30, when retainers 30 are not in use (e.g., as shown in FIG. 3).

The operation of add-on barrier 20 according to the present invention is as follows.

First, using lockers 31 a user erects barrier 20 and thereafter mounts barrier 20 over wheelbarrow 22. The user ensures that legs 28 secures barrier 20 in position.

Then, the user inserts bag 40 (or two bags one next to the other) into expanded volume 32. Bag(s) 40 are preferably selected large enough to encompass the whole volume.

Thereafter, the user retains bag(s) 40 in position by snapping snap-on clips 38 onto walls 26 of frame 24, such that the edges of bag(s) 40 are firmly caught between clips 38 and the upper edges of walls 26. The combination of wheelbarrow 22 and barrier 20 is now ready for use.

When bag(s) 40 are filled with debris (e.g., gardening debris), clips 38 are unfastened and the debris, which is contained in bag(s) 40, as well as bag(s) 40 themselves are discarded. New bag(s) 40 may be employed for the following round.

The walls of the barrier of the present invention are constructed such that all of their components, including the net structure and the bag retainers, both straps and clips, may be simultaneously manufactured by a single plastic injection into a suitable mold.

This is achieved by dedicating the plastic material that should have otherwise filled the openings formed in the walls of the frame to form the retainers. This in turn reduces the manufacturing costs of the inventive barrier.

The add-on barrier of the present invention enjoys an advantage as compared with the prior art since it includes integral hinged snap-on bag retainers.

While the invention has been described with respect to a limited number of embodiments, it will be appreciated that many variations, modifications and other applications of the invention may be made.

What is claimed is:

1. An add-on barrier for a wheel barrow for expanding the volume capacity of the wheelbarrow, the barrier comprising a substantially rectangular baseless frame having substantially vertically disposed walls, said frame including a frame mount for mounting said frame over the wheelbarrow, said frame further including at least one integral hinged bag retainer for retaining a bag in an expanded volume formed by volume contributions of the wheelbarrow and said frame, said at least one bag retainer having a snap-on clip for fixing the bag to said frame and said at least one bag retainer being integrally formed with a portion of said substantially vertically disposed walls.

2. The add-on barrier of claim 1, wherein said baseless frame has a net structure.

3. The add-on barrier of claim 1, wherein said baseless frame is made of a material selected from the group of metal and plastic.

4. An add-on barrier for a wheel barrow for expanding the volume capacity of the wheelbarrow, the barrier comprising:

a substantially rectangular baseless frame having substantially vertically disposed walls, said frame including a plurality of legs for mounting said frame over the wheelbarrow, said frame further including a plurality of integral hinged bag retainers for retaining a bag in an expanded volume formed by volume contributions of the wheelbarrow and said frame, wherein each of said plurality of integral hinged bag retainers includes a flexible strap connected to or integrally formed with said frame at one end and a snap-on clip connected to said strap on its other end, said snap-on clip serving for fixating the bag to said walls of said frame, thereby retaining the bag in said expanded volume.

5. An add-on barrier for a for a wheel barrow for expanding the volume capacity of the wheelbarrow, the barrier comprising:

a substantially rectangular baseless frame having substantially vertically disposed walls, said frame including a plurality of legs for mounting said frame over the wheelbarrow, said frame further including a plurality of integral hinged bag retainers for retaining a bag in an expanded volume formed by volume contributions of the wheelbarrow and said frame, wherein said walls of said frame are formed with a plurality of openings which accommodate said plurality of integral hinged bag retainers when said retainers are not in use.

6. The add-on barrier of claim 4, wherein said walls of said frame are formed with a plurality of openings which accommodate said plurality of integral hinged bag retainers when said retainers are not in use.

7. The add-on barrier of claim 1, wherein said frame is collapsible.

8. A combination comprising:

(a) a wheel barrow; and (b) an add-on barrier for expanding the volume capacity of said wheelbarrow, said barrier including a substantially rectangular baseless frame having substantially vertically disposed walls, said frame including a frame mount for mounting said frame over the wheelbarrow, said frame further including at least one integral hinged bag retainer for retaining a bag in an expanded volume formed by volume contributions of said wheelbarrow and said frame, said at least one bag retainer having a snap-on clip for fixing the bag to said frame and said at least one bag retainer being integrally formed with a portion of said substantially vertically disposed walls.

9. The combination of claim 8, wherein said baseless frame has a net structure.

10. The combination of claim 8, wherein said baseless frame is made of a material selected from the group of metal and plastic.

11. A combination comprising:

(a) a wheel barrow; and (b) an add-on barrier for expanding the volume capacity of said wheelbarrow, said barrier including a substantially rectangular baseless frame having substantially vertically disposed walls said frame including a plurality of legs for mounting said frame over the wheelbarrow, said frame further including a plurality of integral hinged bag retainers for retaining a bag in an expanded volume formed by volume contributions of said wheelbarrow and said frame, wherein each of said plurality of integral hinged bag retainers includes a flexible strap connected to or integrally formed with said frame at one end and a snap-on clip connected to said strap on its other end, said snap-on clip serving for fixating the bag to said walls of said frame, thereby retaining the bag in said expanded volume.

12. A combination comprising:

(c) a wheel barrow: and (d) an add-on barrier for expanding the volume capacity of said wheelbarrow, said barrier including a substantially rectangular baseless frame having substantially vertically disposed walls, said frame including a plurality of legs for mounting said frame over the wheelbarrow, said frame further including a plurality of integral hinged bag retainers for retaining a bag in an expanded volume formed by volume contributions of said wheelbarrow and said frame, wherein said walls of said frame are formed with a plurality of openings which accommodate said plurality of integral hinged bag retainers when said retainers are not in use.

13. The combination of claim 11, wherein said walls of said frame are formed with a plurality of openings which accommodate said plurality of integral hinged bag retainers when said retainers are not in use.

14. The combination of claim 8, wherein said frame is collapsible.

15. The combination of claim 8, further comprising:

a bag retained by said at least one integral hinged bag retainer, said bag encompasses said expanded volume formed by said volume contributions of said wheelbarrow and said frame.

16. The add-on barrier of claim 1, wherein said frame mount includes a plurality of legs for mounting said frame over the wheelbarrow, and said at least one integral hinge bag retainer is a plurality of integral hinge bag retainers.

17. The combination of claim 8, wherein said frame mount includes a plurality of legs for mounting said frame over the wheelbarrow, and said at least one integral hinge bag retainer is a plurality of integral hinge bag retainers.

* * * * *